INVENTOR
COENRAAD GERARD HERMAN SCHOLTEN
BY Haseltine and Nydick[?]
ATTORNEYS

INVENTOR
COENRAAD GERARD HERMAN SCHOLTEN
BY Hane and Nydick
ATTORNEYS

INVENTOR
COENRAAD GERARD HERMAN SCHOLTEN
BY Hane and Nydick
ATTORNEYS

United States Patent Office 3,234,519

Patented Feb. 8, 1966

3,234,519

CONDITIONALLY OPERATING ELECTRONIC DATA PROCESSING SYSTEM

Coenraad G. H. Scholten, Hengelo, Netherlands, assignor to N.V. Hollandse Signaalapparaten, Hengelo, Netherlands, a corporation of the Netherlands Filed Mar. 23, 1961, Ser. No. 97,876

Claims priority, application Great Britain, Mar. 29, 1960, 11,011/60

10 Claims. (Cl. 340—172.5)

The invention relates to an electronically operating data-processing system, operable in various sequences of operations and which performs a sequence of operations controlled by a program of instructions. The invention relates particularly to systems in which instruction words stored in individual locations of a program storage control an operation and also the selection of the location in the program storage storing the instruction word by which the following operation is controlled. Furthermore, program-modifying means are provided which are capable of changing, depending upon an event such as the character of the result of an operation that has occurred previously to said selection in the sequence of operations, the part of the instruction word supplied by a location in the program memory which part will control said selection.

Operations of this type are called "conditional operations." The selection of the location in the program memory may depend upon the fact that the result of a certain operation is either positive, zero or negative; that this result is either higher or lower than a given value; that this result is either equal or not equal to another value; or upon other characteristics of this result or of the previous operations as prescribed by the sequence of operations to be effected by the system. Conditional operations are standard practice in computer techniques and are described, for instance, in "High Speed Data Processing" by Gottlieb and Hume, published by McGraw-Hill, 1958. As a result of such operation, the address of the location in the program memory controlling the next operation is to be changed. In various cases, however, it is desirable for the selection of a location in the program memory to depend on the result of an operation which is separated from the selection by a fairly large number of operations controlled by other locations of the program memory. Such a conditional operation will hereinafter be called a "delayed conditional operation."

According to the invention a very effective system for controlling such a delayed conditional operation is obtained if the system comprises at least one processing unit, data storage means comprising a number of locations for storing data, program storage means with a number of locations, each for storing a fixed instruction word capable of controlling one cycle of the system, means responsive to certain bits in certain positions of an instruction word for selecting locations in the data storage means, means responsive to certain bits in certain positions of a program word for setting said processing unit so as to effect certain operations with data stored in the selected locations of the data storage means, means responsive to other bits of a program word constituting a program address for selecting the location in the program storage means storing the instruction word which is to control the next cycle of operations, processing means, decision-establishing means receiving results obtained in the processing means and deciding whether said result fulfills a certain condition, output circuit means for each of the said decision-establishing means, to which the decision-establishing means, depending upon the decisions taken, apply different potentials, a number of decision registers comprising storage means including input circuits for controlling the setting of the said storage means and output circuit means for reading the setting of the said storage means, an input selection and a channel between said input selector and the output circuit means of the decision-establishing means and control means for said input selector controlled by certain bits in certain positions of an instruction word to cause said selector to establish a control connection between the said channel and input circuits of storage means in a decision register identified by the said bits, over which control connection the storage means are set in accordance with the potential supplied over said channel, modifying means for modifying the program address, as supplied by a location in the program storage means, before it effects the selection of the next location in the program storage means, and an output selector controlled by certain bits in certain positions of an instruction word to establish a connection between said modifying means and output circuit means for reading the setting of storage means comprised in a decision register identified by said bits, said modifying means being controlled over this connection by the storage means, depending upon the setting of said storage means, either to modify the program address as supplied by the program memory or to leave the said address unchanged.

In a system of the type previously described each instruction word may comprise several parts, each including a number of bits. One group of bits may cause a selector to be set, which selector selects a location in a data storage in which data to be subjected to the operation defined by the second part of the instruction word is stored. The second part of the instruction word would then store the bits which control the setting of those parts of the system which effect the several operations in an order such that they may subject the data stored in the location in the data storage means already selected to a desired operation. The third part of the instruction word should then comprise bits which are supplied to control the setting of a selector which selects the location in a program storage, which location stores the instruction word which controls the next operation. Generally such bits are stored in intermediate storage means before they actually control the selection of the location in the program storage, since otherwise the next location would be selected by the instruction word before the operation defined by said instruction word is effected. Then such part of the instruction word would pass the program-modifying means. Several examples of ways in which such modification can be effected will be subsequently described.

The influence exerted on such a selection by the decision register consists in changing the program address controlling the selection of the location in the program memory which is to control the operation to be effected after the conditional selection, on the understanding, however, that as a rule, the said address remains unchanged in the case of a certain setting of the decision register.

In a simple form of such a delayed conditional selection the location in the program memory controlling the operation preceding the conditional selection selects, in cooperation with the decision register, one out of two possible locations in the program memory. It is possible, however, that in this way a system is able to select out of a larger number of possible locations in the memory, depending on the setting of the decision register. The decision register should then be able to register a corresponding number of different decisions.

The invention creates a very effective method for causing a conditional selection, controlled by the instruction word stored in a certain location in the program memory to depend upon the fact of whether a certain operation, or an operation controlled by the instruction word stored in a certain other location in the program memory, either has or has not been effected during the sequence of operations preceding the conditional selection when the system performs the program in which the said conditional selection occurs. It may be important to remark here that in this specification the expression "sequence of operations" is used for a number of operations successively effected by a data-handling system when performing a program, each of which operations is selected by a program address comprised in the instruction word of the preceding operation, apart from changes in the said address resulting from conditional operation. In some cases, for instance, various sequences of operations, the object of each of which is to solve a certain problem, have a part in common. The parts preceding the common part of the sequences, as well as the parts following this common part, are, however, different. Consequently the selection following the common part of the sequences must be conditional and depend upon the part of the sequence performed before the common part. In order to bring about such a conditional operation, according to the invention a decision register is selected and set in a certain condition under the control of the instruction word stored in the location in the program memory controlling a certain operation, and this same decision register is again selected by the output selector under the control of the location in the program memory controlling the selection, which depends upon the fact whether the said operation has been previously effected or not, causing the said decision register to be connected to the circuits by way of which the said selection is effected for the purpose of permitting the decision register to influence said selection.

The application of decision registers is advantageous only if a selection should be influenced which takes place after a number of operations controlled by other locations in the program memory have been effected. If the selection of the next location in the program memory is to be influenced, the application of a decision register has no advantages, as will be shown later. Preferably, therefore, the system according to the invention is arranged in such a way that no decision registers are applied for the purpose of influencing the next selection. In a very effective form of a system according to the invention the location in the program memory controlling an operation or a group of operations, upon the result of which the next selection depends, also causes a direct connection to be established between the device which derives the character of the influence to be exerted from the said result and the device for influencing the said selection. Preferably either the input selector or the output selector or both selectors are set in order to establish the said connection. The number of decision registers may be substantially smaller than the total number of conditional selections occurring in all sequences of operations which can be effected by the system, for a decision register is not alloted to a certain conditional selection but may, in principle, be selected by the input selector for the purpose of registering a decision related to each of the conditional selections which may be effected in the system, provided, however, that the said register is free at the moment at which the said decision becomes available. As a rule the number of decision registers may be even smaller than the number of conditional selections occurring in the sequence of operations with the largest number of conditional selections which can be effected by the device, for in many cases a decision register on which a certain decision was registered becomes available again before certain other decisions, which are to influence other selections, become available, so that these decisions can be registered on those same registers which have become free again.

If a decision depends upon the result of a certain operation, it, as a rule, becomes available in the arithmetic unit of a computer effecting the said operation. The character of this decision is signalled by way of a connection for this purpose from the said arithmetic unit to the said input selector.

The invention will now be elucidated by describing embodiments of the invention with reference to the figures. Further characteristics of the invention will become clear therefrom.

FIGURE 1 shows a block diagram of a system according to the invention.

FIGURE 2*a* shows the symbol for a trigger circuit used in this specification.

FIGURE 2*b* shows the details of the control circuits of the trigger circuit shown in FIGURE 2*a*.

In order to facilitate the understanding of this specification the application of the invention to an electronic computer is described, but it is obvious that the invention may just as well be applied to any system for data processing.

Figure 1:
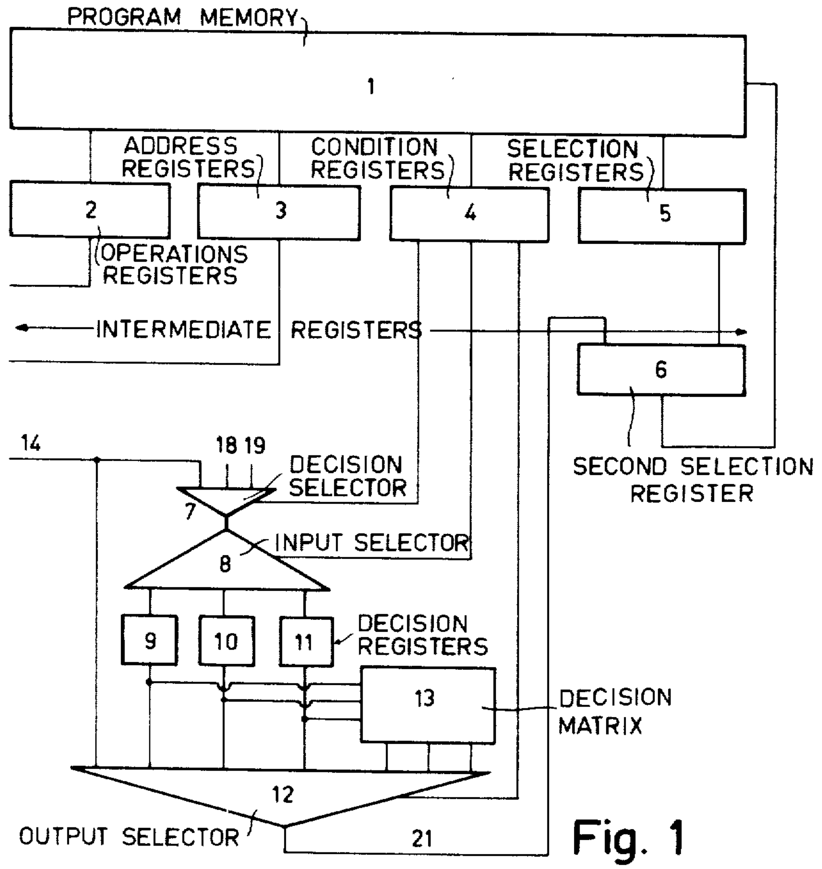

FIGURE 1 shows that part of an electronic computer according to the invention which controls the programming. The other parts of the computer are not shown and may be constructed in a well known way. Conditional operations are described for instance in "Arithmetic Operations in Digital Computers" by R. K. Richards, in particular in the chapter, "Computer Organization and Control," on pages 338 and 339. Part 1 is the program memory, which comprises a number of locations, each of which registers an instruction word and is able to supply this word after having received an order for that purpose. The program memory may consist of a magnetic matrix memory in which, by means of small permanent magnets or in some other way certain signals have been permanently registered, or to which a certain program is temporarily transferred from another memory, such as a drum storage registering a number of programs.

The parts 2, 3, 4 and 5 are intermediate registers. Each of these intermediate registers a part of the instruction word is transferred from the location in the program memory as soon as the operation to which the said instruction word relates is to be effected. The locations in the program memory in which the said instruction word is registered is selected for this purpose by the location in the program memory controlling the previous operation. Register 2, the operation register, receives an indication of the character of the operation to be effected (such as addition or subtraction etc.) and controls the arithmetic unit (not shown) correspondingly. Register 3, the data address register, receives the data address of the location in the data storage means in which the number is registered to which the said operation is to be applied.

Register 5, the selection register, receives the information related to the following operation to be effected. This information, the program address, controls the selection of the location in the program memory which stores the instruction word, which is to control the said following operation, and is the address of the said location.

It appears from the above that the computer described in the specification operates with two addresses, a data address and a program address but it is obvious that the application of the conditional operation according to the invention is not restricted by the number of addresses, so that this method for conditional operation can also be applied in the computers operating with other than two addresses. Register 4 is the condition register, in which information related to conditional operation is stored.

All these registers are registers with bi-stable trigger circuits, just as the second selection register 6, which must still be described and the setting of which is changed in this embodiment by the means for modifying the program.

In non-conditional operation the address of the following location in the program memory is completely determined by the program address stored in the selection register 5. Before this selection is performed this program address is transferred to the second selection register, which controls the selection. This second selection register prevents the selection from being disturbed by the new program address, which, as a result of the selection, is transferred from the location in the program memory to the selection register, for the selection consists of the reading of a line in the matrix, constituting the program memory and, consequently, immediately causing the selection register to be set in accordance with the new program address. The second selection register, however, maintains its setting and continues to indicate the same location in the selection register.

In the embodiment first described the program address for a conditional selection either remains unchanged or is changed by a certain value, depending upon the decision. A very simple method for influencing the conditional section is applied. The program address indicating the location in the program storage storing the instruction word, which is to control the next operation, is signalled in a binary code. In a program address supplied by the program storage for the purpose of controlling a conditional selection, a certain code element, e.g. a code element with the lowest value, always has a certain one of its two possible values, e.g. the value 0. This is valid for all program addresses related to an operation followed by a conditional selection. When the second selection register is set in accordance with such a program address the bi-stable trigger circuit which stores this element is always in the condition corresponding to the said type of element. If the said program address should be changed in connection with a conditional operation a voltage is applied by way of line 21 to a "special input circuit" of this trigger circuit, by means of which this circuit can be triggered. A voltage of this character applied to the line 21 if a change in the address is to be effected, urges the trigger circuit into the condition other than that into which it is set by the instruction word for a conditional selection. The said voltage pulse, therefore, causes the said trigger circuit to change its condition. In this way the value of the element stored in this trigger circuit is either added to, or subtracted from the address in a very simple way. If no voltage is applied to the said special input circuit the address remains unchanged.

In the event a certain selection is conditional and depends upon the result of a certain operation, the decision related to this conditional selection is made in decision-establishing means cooperating with the arithmetic unit as soon as said result becomes available. This is effected as is conventional in non-delayed conditional operations in data-processing machines, and hence need not be described in detail in this specification. An article pertaining to this type of operation may be found in "High Speed Data Processing" by Gottlief and Hume, published by McGraw-Hill Book Company, 1958. A signal corresponding to the decision is sent via connection 14 to the programming arrangement for temporarily storing decisions. This arrangement comprises an input selector 8, an output selector 12 and various decision registers, such as 9, 10 and 11. These selectors determine to which part of this arrangement the said signal is applied as will be described later. These selectors are controlled by the condition reigster in accordance with certain elements of the instruction word which are transferred from the program memory to this register.

If the conditional operation is not delayed, so that the signal applied to the connection 14 is related to the next selection, this signal is not stored in a decision register, but it exerts a direct influence upon the setting of the second selection register. For this purpose the elements controlling the setting of the input selector 8 and the output selector 12 are comprised in an instruction word related to a non-delayed conditional selection are such that the output selector 12 establishes a direct connection between the line 14 and the line 21, causing the decision signal to be applied directly to the second selection register. Depending upon the decision, either a voltage controlling a change in the address or no voltage is applied to this connection.

If the signal applied to line 14 relates to a delayed conditional selection, this signal must be stored in a decision register (9, 10, 11). In this case the elements in the instruction word transferred by the program memory to the condition register that the decision selector 7 and the input selector 8 establish a connection between the line 14 and a decision register which at that moment does not store a decision to be used later on in the sequence of operation. As the computer comprises a sufficient number of decision registers, such a "free" register is in any case available. All sequences of operations are known which can preceede the operation during which the decision to be registered becomes available. Consequently, it is also known which decision registers may be occupied by decisions relating to conditional selections which do not take place before the operation on which the decision to be registered is based. These decision registers are not available. All other decision registers are available. In programming the machine the elements incorporated in the instruction word, and controlling decision selector 7, the input selector 8 and the output selector 12 are so chosen that they cause the decision selector and the input selector to establish a connection between the line 14 and one of the decision registers, which, in any case, are available independently of the previous sequence of operations.

In the embodiment described, each decision register comprises a bistable trigger circuit. If this circuit is in one of its two conditions it leaves the address unchanged when it is selected, by the output selector 12, for the purpose of influencing a conditional selection. If, on the other hand, the said bi-stable trigger circuit is in its other condition, it controls a change in the program address when it is selected by the output selector. If a conditional selection should depend upon the fact whether a certain operation has taken place during the previous sequence of operations or not, then whilst such an operation is being performed, a decision register must be set for the purpose of exerting the desired influence on the selection to be performed later. On the positions for the elements controlling, by way of the condition register, the selectors establishing the connections to the decision registers, the instruction word for such an operation comprises, therefore, such elements that the input selector 8 establishes a connection to a decision register, which at that moment is available. This decision register must be set in a condition which is indicated that the said operation is effected. This condition has no relation to the result of the said operation. Therefore, the decision selector 7, controlled by the said element registered in the condition register, does not connect the input circuit of the input selector to the line 14, but connects it to one of the lines 18 or 19. Such voltages are applied to these lines, that a connection with the line 18 causes the trigger circuit in the selected decision register to be set in its one condition whilst a connection to the line 19 sets the trigger circuit in the selected decision register to its other condition. It is necessary to use this two-way control of the trigger circuit, because the trigger circuits in the decision registers are not reset. It will now be shown, that in this way an effective control of the conditional selection may be obtained. Be it assumed that two sequences of operations, the sequence A and the sequence B lead to the same conditional selection through a common part of both sequences. The said conditional selection must depend upon the fact whether the sequence of operations preceding the said selection commences by way of the sequence A or by way of the sequence B. For this purpose an operation A*a* is allotted, which is only present in the sequence A, whilst another operation B*b* is allotted, which is only present in the sequence B. If the sequence A precedes the conditional selection, a decision register is selected whilst the operation A*a* is performed. The said selected decision register should be available while the operation A*a* is being performed in the sequence A as well as when the operation B*b* is being performed in the sequence B. This register is now set as described above, in such a condition, that it will control the conditional selection in the way required by the fact that the sequence A precedes the said selection. If the sequence B precedes the conditional selection then the same decision register is selected whilst the operation B*b* is being performed. In this case the said register is set in such a condition that, as soon as the delayed conditional selection is reached, the opposite influence is exerted on the said selection. The same method of operation is possible if more than two sequences of operations eventually lead to the same delayed conditional selection. For this purpose a certain decision register must be set in accordance with the influence to be exerted on the selection while in each of these sequences an operation is being performed which is only present in the said sequence.

Be it assumed that in a sequence of operations an operation is reached which is followed by a delayed conditional selection. This decision is stored in a certain decision register, independently of the considerations on which the decision, related to this selection is based. Which register stores this decision is known from the program of the system. The instruction word controlling the said delayed conditional selection as well as the operation preceding the selection, and provided by the program memory, contains such code indications in the position for the elements controlling the setting of the three selectors for the conditional operation that the output selector establishes a connection between the decision register in which the said decision is stored and the line 21 to the second selection register. Depending upon the setting of the said decision register, the address of the next location in the program memory is then either changed or not.

The circuit according to the invention can also be provided with a decision matrix 13 which permits a program address to be made depending upon the condition of more than one decision register. In the most universal embodiment of such a decision matrix two sets of conductors are situated in such a way that, by means of diodes, connections can be established between each conductor of the first set and each conductor of the other set. The conductors comprised in the first set are the input circuits of the matrix. In the most universal embodiment this set comprises two conductors for each bistable trigger circuit in each decision register of the system. If such a trigger circuit is in one of its two conditions the first of the conductors connected to this circuit has a high potential, whilst the second one has a low potential. If the trigger circuit is in its other condition, the second conductor has a high potential, whilst the first one has a low potential. The conductors comprised in the second set constitute the output circuits of the decision matrix. Each of these output circuits can be connected by way of the output selector to the line 21, with the exception of what follows below in connection with combined output circuits. The application of this decision matrix permits amongst other things the following measures:

(1) A conditional selection can be made depending upon the fact that a number of decision registers are in certain conditions. In this case a certain output circuit of the matrix is allotted to this combined condition. This output circuit is connected by way of diodes constituting an "and" circuit to those conductors connected to the trigger circuits in the decision registers which will obtain a high potential if the said condition is satisfied. If the said condition is satisfied, the said output circuit consequently obtains a high potential, which, by way of the output selector, will control the required change in the program address. It is obvious that if the directions of the diodes and of the potentials are reversed, the said output circuits can also be connected to the wires which will obtain a low potential if the conditions are satisfied. This may be important if a certain type of potential is required for controlling the change in the address.

(2) The delayed conditional selection can be made to depend upon the fact whether at least one of a number of decision registers is in a certain condition. In this case the output circuit of the decision matrix allotted to this condition is connected by way of diodes, constituting an "or" circuit to those output circuits of the trigger circuits in the decision registers which will obtain a certain potential for example a high potential if the said condition is satisfied.

(3) The decision can be made to depend upon certain alternative combinations of conditions of the decision registers. For this purpose in a certain embodiment certain output circuits of the decision matrix are connected by way of "and" circuit to certain output circuits of the trigger circuits in the decision registers, whilst the said output circuits of the decision matrix are combined by way of "or" circuits to a common output circuit connected to the output selector. In another embodiment certain output circuits of the decision matrix are connected by way of "or" circuits to certain trigger circuits in the decision registers, whilst these output circuits of the decision matrix are combined by way of "and" circuits to a common output circuit. In more complicated embodiments for more complicated conditions certain output circuits of the matrix are connected by way of "and" circuits to the wires to the decision registers, whilst other output circuits are connected by way of "or" circuits to such output circuits of the decision registers, whilst the output circuits of the decision registers, whilst the output circuits of the decision matrix are combined by "and" circuits, "or" circuits, or by a combination of these circuits to a common output circuit.

In the embodiment described above only one and the same element in the program address is changed in the conditional selection. If the addresses are efficiently arranged, the change of one element will, as a rule, be sufficient for the purpose of arranging a fairly complicated conditional program. It is, however, very simple to build the system in such a way that the element to be changed in the address depends upon the operation which is effected, or in such a way that more than one element is changed. In a very efficient embodiment a certain element in the program address is changed in the case of a delayed conditional operation, whilst another element is changed in the program address in the case of a non-delayed conditional selection. A simple circuit for this purpose is obtained if the program addresses relating to conditional selections are arranged in such a way that the elements to be changed always have a certain value, e.g. always 0 or always 1. In this case it is not obligatory that in each address relating to a conditional selection both elements should have this value.

It is sufficient if the element which is to be changed during the conditional selection has this value. In the case described, for a delayed conditional selection the one element should have this value whilst in a non-delayed conditional selection the other element should have this value. In a certain embodiment, in all program addresses relating to a conditional selection the first and the third element, as seen from the lower digits, have the value 0. When the second selection register is set in accordance with such an address the trigger circuits on which the first and third element are registered will be in the conditions corresponding to the value 0. In the said embodiment the first element is changed during a delayed conditional selection, and the third during a non-delayed conditional selection, and the output selector possesses two output circuits. During a non-delayed conditional selection the line 14, through which the decision is signalled, is connected by way of the output selector to the output circuit which leads to that input circuit of the third trigger circuit in the second selection register, by way of which this trigger circuit can be set in the condition corresponding to the element 1 by a potential of the type which is applied to the line 14 when the address is to be changed. Consequently, during a non-delayed conditional selection the third element of the program address is immediately changed as soon as the decision becomes available. The output selector can connect its second output circuit to an output circuit of one of the decision registers and, if such a matrix is present, to one of the output circuits of the decision matrix. This second output circuit is connected by way of the line 21 to that input circuit of the first trigger circuit in the second selection register by way of which this trigger circuit can be set in the condition 1. Consequently, if a change of address appears to be required during a delayed conditional selection, then in this embodiment the first element of the address is changed.

If the same combination of elements is to be changed in a certain way for all types of conditional operations, or for a certain type of conditional operation, the input circuits of the trigger circuits in the second selection register which are capable of controlling the required change in these elements are connected in parallel to an output circuit of the output selector. If in some cases a certain element, and in other cases this element in combination with another element, is to be changed, it is advantageous to control the trigger circuit the condition of which is to be changed in both cases, by way of an "or" circuit.

It may be advantageous to change the program address by different values in different cases. For this purpose an adding arrangement must be inserted somewhere in the circuit by way of which the selection of the next location in the program memory is controlled. A suitable position for such an adding device is present between the selection register and the second selection register. Depending upon the decision, this adding arrangement either adds a value which depends upon the circumstances, or zero to the address. Preferably the value to be added is incorporated in the instruction word, the elements in this word defining the said value being transferred to the condition register, by which they are applied to the adding arrangement.

In the above the invention is only described with reference to an embodiment in which the sequence of operations is continued in one of two different ways after a conditional selection has been effected, depending upon the decision related to this decision. The application of the invention is, however, by no means restricted to such an arrangement. It also permits the building of a system in which, after a delayed conditional selection, depending upon the decision, the sequence of operations may be continued in more than two different ways. In an embodiment of such a system according to the invention using a delayed conditional selection, the program address remains unchanged if a certain result, obtained during a previous operation, satisfies a first condition e.g. because it is situated between two limits, whilst this address is changed in a first way if the result satisfies a second condition, e.g. because it is situated above the highest of the said two limits, whilst the address is changed in a second way if the said result satisfies a third condition, e.g. is situated below the lowest limit mentioned above. Such a conditional operation can in accordance with the invention, be effected in various ways. In a first embodiment each decision register is able to store a number of decisions which is at least equal to the largest number of different ways in which the sequence of operations may be continued after a conditional selection. A decision register comprising two trigger circuits is able to store four possible decisions. Depending upon the decision stored in the decision register, different values will be added to the program address. This may be effected in a very simple and efficient way by causing each trigger circuit in the decision register to influence a trigger circuit in the second selection register which stores a certain element of the address. Depending upon the setting of the trigger circuits in the decision register there are four possibilities: nothing is added to the address, a value corresponding to the first element capable of being changed, a value corresponding to the second element capable of being changed, or a value corresponding to the sum of these elements is added to the address. Each of the two trigger circuits in the decision register must for this purpose be connected by a separate connection by way of the output selector to the corresponding trigger circuit in the selection register.

This method has the disadvantage that, although such complicated decisions are relatively rare, nevertheless each decision register must comprise more than one trigger circuit. It is, however, possible to avoid this complication by using one extra location in the program memory for such a complicated delayed conditional selection, this location controlling a selection but not controlling an operation. The selection which is immediately effected after the operation preceding the conditional selection in this case selects between two following locations, one of which controls an operation in a normal way, whilst the other one controls a second part of the conditional selection without controlling an operation. If the number of conditional selections with more than two possibilities is restricted, moreover only part of the decision registers may be built for this larger number of possibilities, these registers being mainly reserved for such complicated selections and, as a rule, only indicated by the instruction word for these complicated selections.

The three selectors used in the system described above should operate at a speed which is comparable to the speed of operation of an electronic data processing system. Electronic switches must, therefore, be used. These switches can be built as a network comprising grid-controlled tubes or transistors as switching elements, but preferably a network is applied comprising diodes as switching element, such diodes for the greater part cooperating in "and" or "or" circuits. In order to restore the voltage level which will be changed by such circuits if connected in cascade and to supply the current taken by the said circuits, after a certain number of stages, amplifiers are inserted. Preferably these amplifiers are transistor-amplifiers, such as emitter followers.

Figures 2A, 2B, 3, 4:
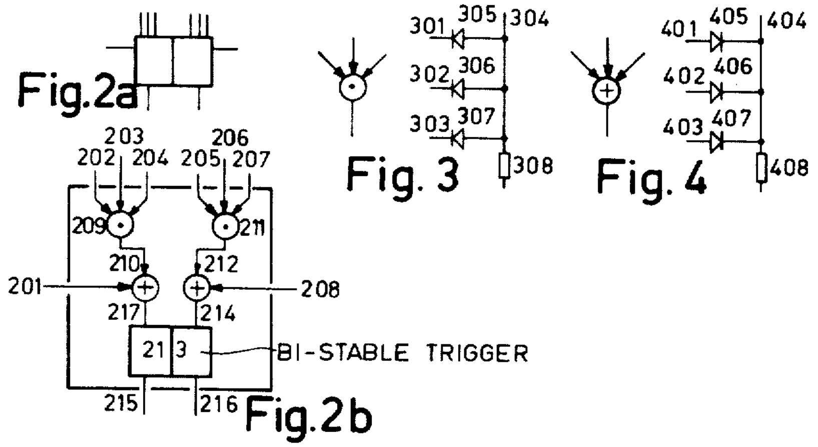
FIGURE 3 shows an "and" circuit and its symbol.
FIGURE 4 shows an "or" circuit and its symbol.

In order to simplify the drawings special symbols have been used for a trigger circuit with its control circuits. This symbol is shown in FIGURE 2*a*, whilst the details of the control circuits are shown in FIGURE 2*b*. The trigger circuit itself comprises in a well-known way two grid-controlled electronic devices or two transistors, which cannot be conductive at the same time, but one of which is always conductive. The inner rectangle 213 in FIGURE 2*b* is the symbol for this trigger circuit and the two parts of this rectangle represent the two electronic devices in the trigger circuit. In this specification the circuit is said to be set if the left hand device is conductive and to be reset if the right hand device of the circuit is conductive. Voltages or pulses applied to one of the conductors 217 and 214 entering the inner rectangle from above cause the trigger circuit to be set or reset. The left hand conductor 217 controls the setting, the right hand conductor 214 the resetting. Voltages can be applied to the left hand input circuit by way of the "or" circuit 210 and the "and" circuit 209. Consequently, the trigger circuit is set if a voltage is applied to the conductor 201 because this voltage reaches the left hand input circuit 217 by way of the "or" circuit 210. It is also set if voltages are applied simultaneously to the conductors 202, 203 and 204, because the "and" circuit 209 then passes these voltages to the "or" circuit 210. In a similar way the trigger circuit can be reset by way of the "or" circuit 212 by applying a voltage to the conductor 208 and by way of the "and" circuit 211 and the "or" circuit 212 by applying voltages to the conductors 205, 206, 207 simultaneously. The circuits 215 and 216 are the output circuits. It is assumed that the circuit 215 obtains a high potential and that the conductor 216 obtains a low potential if the trigger circuit is set, whilst the circuit 216 obtains a high potential and the circuit 215 a low potential if the trigger circuit is reset. The various conductors entering and leaving the large rectangle in FIGURE 2*b* correspond to the conductors shown in the symbol represented in FIGURE 2*a* on the corresponding places.

FIGURE 3 shows an "and" circuit well-known in the art and its symbol. A potential which, under all circumstances, is higher than the potentials of the input circuits 301, 302 and 303 is applied to the lower terminal of the resistor 308. If all input circuits have a low potential, all diodes such as 305, 306 and 307 are conductive and the output circuit 304 has a low potential. If one or two of the input circuits have a high potential the diode connecting the upper terminal of the resistor to the input circuit with a low potential remains conductive, causing the output circuit to have a low potential. If, however, all three input circuits have a high potential, the output circuit will obtain a high potential.

FIGURE 4 shows the well-known "or" circuit and its symbol. It possesses the input circuits 401, 402 and 403, and the output circuit 404. A potential which is, at any rate lower than the input potentials is applied to the lower terminal of the resistor 408. If all the three input circuits have a low potential the three diodes 405, 406 and 407 will be conductive, because the potential applied to the resistor 408 is still lower. Consequently, the output potential will be low. If, however, one of the input circuits obtains a high potential, the diode connecting this input circuit to the output circuit will remain conductive, causing the output circuit 404 to obtain a high potential whilst the diodes connecting the other input circuits with the output circuit become nonconductive. It is obvious that the number of input circuits of an "or" or an "and" circuit is not restricted.

Figure 5:
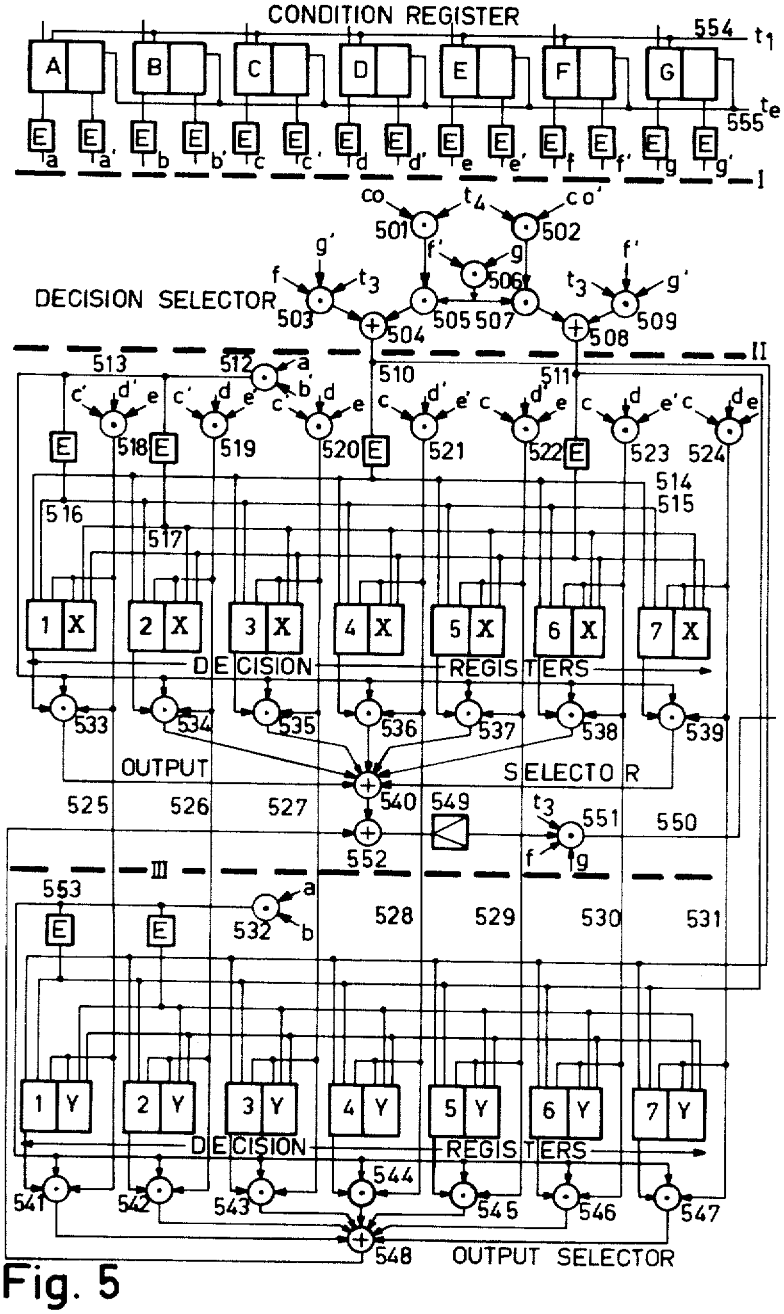
FIGURE 5 shows in greater detail the condition register, the decision registers, the input- the output- and the decision selector of a system according to the invention.

The storing of decisions in the decision registers and reading of these registers in a system comprising 14 decision registers as well as a condition register with 7 trigger circuits for registering 7 elements relating to the conditional operation in the instruction word, will now be described with reference to FIGURE 5. The timing of the various operations in the system is controlled by a recurrent sequence of synchronizing pulses comprising four successive timing pulses $t_1$–$t_4$, and two special purpose intermediate timing pulses $t_e$ and $t_s$. The 7 trigger circuits constituting the condition register are shown above the dotted line I. Each of these trigger circuits registers one of the 7 elements determining the conditional operation comprised in the instruction word. The trigger circuit A registers the element *a*, the trigger circuit B registers the element *b* and so on. For this purpose such a trigger circuit is in the set condition if the element to be registered has the value 1 and in the reset condition if the said element has the value 0. The setting of these trigger circuits is the result of the reading of a line in the matrix memory constituting the program memory of the system. Each of these lines constitutes a location in this program memory and stores one instruction word. The transmission of a program address by the second selection register causes the selection of such a line and the reading of it in the well-known way, which need not be described in detail here.

Such a matrix influences the trigger circuits in the condition register in one direction only. Consequently the condition register must be reset before it receives new information. The resetting is effected by an extra timing pulse $t_e$ used exclusively for this purpose. This pulse is applied by way of conductor 555 to the right-hand "or" circuits in all trigger circuits of the register and occurs in the interval between the timing pulses $t_4$ and $t_1$. The application of $t_e$ permits the condition register to maintain its setting whilst it controls the setting and resetting of the selected decision register in accordance with a result obtained in the arithmetic unit, although this setting and resetting is effected by the pulse $t_4$, which is the earliest one in the sequence of timing pulses after the said result has become available, whilst the resetting of the condition register is nevertheless completed before the transfer of the new information to the register, which transfer is controlled by the pulse $t_1$. The elements constituting the new information reach the trigger circuits in the condition register by way of the outer left-hand input circuits and pass the left-hand "and" circuits of these trigger circuits whilst the pulse $t_1$ is applied to these "and" circuits by way of conductor 554. Each trigger circuit in the condition register possesses two output circuits. The left-hand output circuit of such a trigger circuit obtains a high potential if the trigger circuit is set and a low potential if it is reset, whilst the right-hand output circuit has a high potential if the trigger circuit is reset and a low potential if it is set. Consequently, the left-hand output circuit of such a trigger circuit supplies a replica of the element stored by the said trigger circuit, whilst the right-hand output circuit supplies its inverted value. Therefore, for instance, the right-hand output circuit of the trigger circuit C supplies the inverted element *c'*, whilst the left-hand output circuit supplies the element *c* itself. Each of these output circuits of the 7 trigger circuits is connected to the input circuit of an emitter follower circuit in order to permit each of these output circuits to carry the load resulting from the various operations in the system to be controlled by these output circuits.

The decision selector is shown between the dotted lines I and II. Below the latter dotted line two groups of trigger circuits are shown. Each trigger circuit in these groups constitutes a decision register. The circuit elements situated between the dotted line II and the upper group of decision registers and the circuit elements situated between the dotted line III and the lower group of decision registers together constitute the input selector. On the other hand the parts of the circuit situated between the upper group of decision registers and the dotted line III and the parts of the circuit situated below the lower group of decision registers constitute the output selector. The setting of a decision register is controlled by way of its outer left-hand input circuit, whilst the resetting is controlled by the outer right-hand input circuit. The selection of a decision register is effected by applying high potentials to all the other input circuits, causing the two "and" circuits shown in FIGURE 2*b*, to become capable of passing a pulse for setting or resetting the trigger circuit.

The decision selector possesses two output circuits, the circuit 510 for setting and the circuit 511 for resetting a selected decision register. The circuit 510, for instance, is directly connected to all outer lef-hand input circuits of the decision registers in the lower group, whilst it is connected by way of an emitter follower E to all outer left-hand input circuits of the decision registers belonging to the upper group, for circuit 510 is unable to carry the complete load. A pulse supplied by the output circuit 510 causes the setting of that decision register, the four inner input circuits of which have obtained a high potential, whilst a pulse supplied by the output circuit 511 of the decision selector causes the resetting of such a decision register.

The operation of the decision selector will now be described. It either causes the selected decision register to be set or reset in accordance with the result of an operation, or it causes this register to be set or reset as a result of the fact that a certain operation has been effected. If a decision based on a result of an operation is to be registered, the element *f* in the instruction word has the value 0 and the element *g* the value 1. This causes the "and" circuit 506 to apply a high potential to the input circuits of the "and" circuits 505 and 507. Depending on the result obtained in the arithmetic unit, a high potential signal is applied either to the terminal *co* of "and" circuit 501 or to the terminal *co'* of "and" circuit 502. If, in connection with the said result, the selected decision register should be set, a high potential is applied to the left-hand input circuit *co* of the "and" circuit 501, whilst a low potential is applied to the right-hand input circuit *co'* of the "and" circuit 502. Consequently, the timing pulse $t_4$ will be able to pass the "and" circuits 501 and 505 and the "or" circuits 504 to the output circuit 510, in this way controlling the setting of the selected decision register. If on the other hand the said result requires the resetting of the selected decision register, a high potential is applied to the right-hand input circuit *co'* of the "and" circuit 502, so that the timing pulse $t_4$ will pass the "and" circuits 502 and 507 and the "or" circuit 508 to the output circuit 511 of the decision selector, this causing the resetting of the selected decision register.

If, because a certain operation has been effected, the selected decision register should be set, the element *f* in the instruction word controlling said operation possesses the value of 1, whilst the element *g* posesses the value 0. Consequently no high potential is applied by the "and" circuit 506 to the "and" circuits 505 and 507, so that even if timing pulse $t_4$ passes one of the "and" circuits 501 and 502 it certainly will be stopped by the "and" circuits 505 and 507, so that it will not reach one of the output circuits of the decision selector. Nevertheless the timing pulse $t_3$ will be able to pass the "and" circuit 503 and the "or" circuit 504 to the output circuit 510 of the decision selector, causing the selected decision register to be set. If in connection with the fact that a certain operation is performed, a decision register should be reset, the elements *f* and *g* in the instruction word controlling the said operation both have the value 0. In this case also the timing pulse $t_4$ will not pass beyond the "and' circuits 505 and 507. The timing pulse $t_3$ will, moreover, not pass the "and" circuit 503 so that it will not reach the output circuit 510. The "and" circuit 509, however, to which the inverted elements *f* and *g* are applied, will permit the timing pulse $t_3$ to reach the output circuit 511 by way of the "or" circuit 508, so that this pulse will reset the selected decision register.

The operation of the input selector will now be described. This selector reacts to the elements *a*, *b*, *c*, *d* and *e* in the instruction word. The element *a* has the value 1 if a decision register is required. Be it assumed that the element *b* has the value 0. The element *a* and the inverted element *b* are applied to the "and" circuit 512, so that a high potential is applied to the conductor 513 and, by way of two emitter followers E and the conductors 515 and 516, to all middle left-hand and middle right-hand input circuits of the trigger circuits present in the upper group of decision registers. Which of these decision registers in the upper group is selected is determined by the potentials of the conductors 525 to 531. Each of these conductors is the output circuit of one of the "and" circuits 518 to 524. The elements *c*, *d* and *e* and their inverted values are applied in various combinations to the three input circuits of each of the latter "and" circuits. If, for instance, the elements *c* and *d* have the value 0 and the element *e* has the value 1, the "and" circuit 518 applies a high potential to the conductor 525. Because the said elements are applied in other permutations to the input circuits of all other "and" circuits of the same group, all the other lines of the group 525 to 531 will have a low potential. The said high potential of the line 525 is applied to the inner input terminals of the trigger circuit 1 X in the upper group, and of the trigger circuit 1 Y in the lower group. Which of these two trigger circuits is selected is determined by the potential applied to the middle right-hand and middle left-hand terminals. Because the element *b* has the value 0, only the "and" circuit 512 applies a high potential to its output circuit, whilst the "and" circuit 532 applies a low potential to its output circuit. Consequently none of the trigger circuits in the lower group can be selected. Only the trigger circuit in the upper group selected by the high potential on the line 525 will become capable of being set or reset by a potential supplied by way of the decision selector.

The output selector selects a decision register by means of one of the "and" circuits 533–539 if the register is in the upper group, and by means of one of the "and" circuits 541–547 if the register is in the lower group. Input and output selector in the embodiment described are controlled by the same voltages, so that these selectors simultaneously select the same decision register. When, for instance, the decision register 3 Y is selected as a result of the fact that the "and" circuit 532 applies a high potential to its output circuit 553 and the "and" circuit 520 applies a high potential to conductor 527, the right-hand and the middle input circuit of "and" circuit 543 also obtain a high potential, so that the said circuit will permit a high potential to reach the "or" circuit 548 if such a potential is applied to its left-hand input circuit by the trigger circuit in the decision register 3 Y in its set condition. The said "or" circuit applies the said high potential by way of the "or" circuit 552 and the amplifier 549 to the "and" circuit 551. This "and" circuit decides whether and when the output selector will actually permit a voltage, applied to this selector by the selected decision register, to reach the output circuit of this selector. In order to start the "reading" of the condition of a decision register these elements must have such values that they cause the output selector to select the register to be "read," whilst the last two elements must have the value 1. The latter two elements are applied to two input terminals of the said "and" circuit 551, and if the third input terminal obtains a high potential from the selected decision selector by way of "or" circuit 552, the timing pulse $t_3$ will pass to the circuit 550, which leads to a control terminal of the same type as the terminal 231 in FIGURE 2*b* of the trigger circuit in the second selection register the setting of which trigger circuit is to be changed in connection with the condition of the selected decision register.

Figure 6:
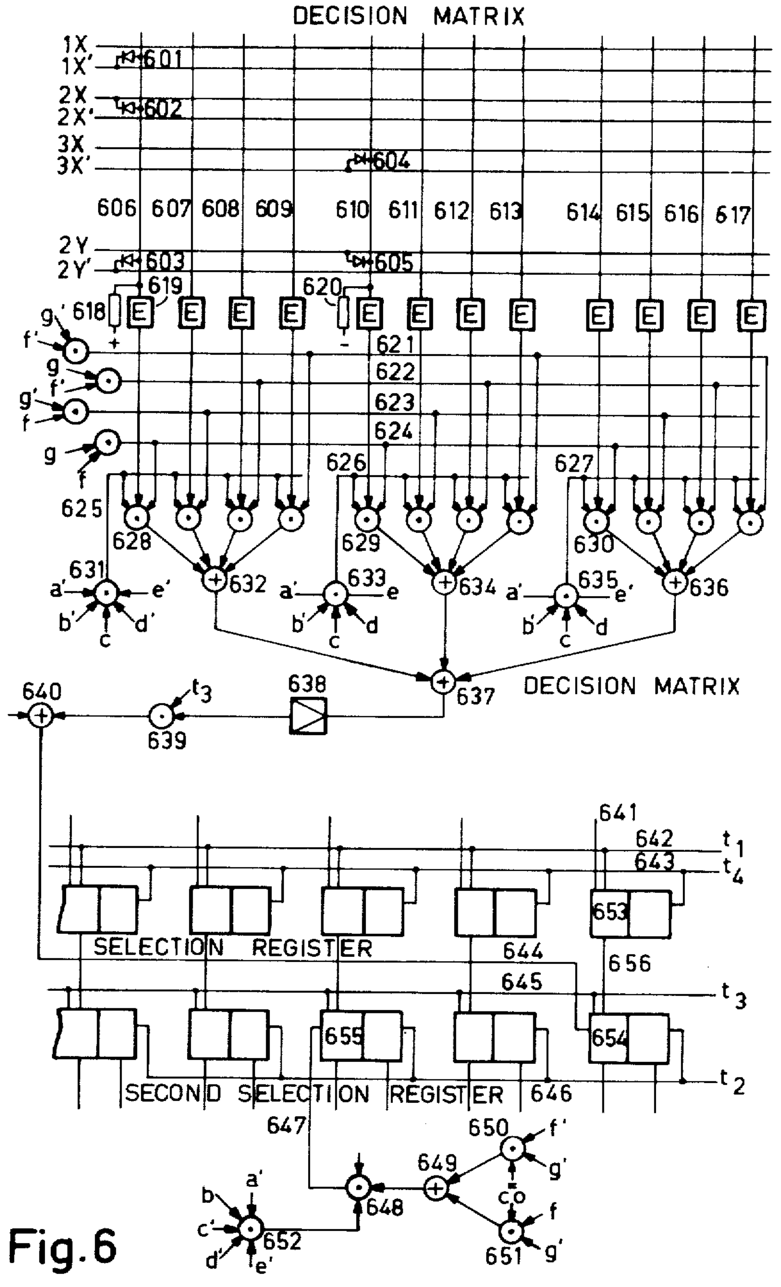
FIGURE 6 shows in greater detail the selection register and the second selection register as well as a decision matrix with the cooperating part of the output selector.

The registering and reading of decisions in decision registers having been described, the changing of the program address will now be elucidated with reference to FIGURE 6. In the lower part of this figure a part of the selection register comprising the trigger circuit 653 and a part of the second selection register with the trigger circuits 654 and 655 are shown. Before a new address is transferred to the selection register all trigger circuits in this register are reset by applying the timing pulse $t_4$, by way of conductor 643, to the right-hand input circuits connected to the right-hand "or" circuits in these trigger circuits. A short interval after the resetting, the first timing pulse $t_1$, which follows the pulse $t_4$, is applied by way of conductor 642 to all left hand "and" circuits of the trigger circuits in the selection register. Consequently these "and" circuits will be able to permit the pulses which the matrix in the program memory applies to conductors such as 641, as a result of the reading of the line storing the next instruction word, a trigger circuit connected to such a conductor is to be set in connection with the fact that the bit to be registered in the said trigger circuit is 1. Consequently, during the occurrence of the timing pulse $t_1$ the new program address is stored in the selection register.

The second selection register controls the selection of the location in the program memory to be read. For this purpose the left- and right-hand output circuits of all trigger circuits in this register are connected to a decoding matrix or a similar decoding circuit, which selects the line in the matrix memory to be read in a well-known way not described here. Consequently the resetting of the trigger circuits in the second selection register should be delayed until the reading of the new program address has been completed. Actually the resetting of the trigger circuits in the second selection register is effected by the timing pulse $t_2$, which occurs later than the pulse $t_1$ and the reading of the new address, and is applied by way of conductor 646 to the right hand "or" circuits in these trigger circuits. The transfer of the new address from the selection register to the second selection register is controlled by the pulse $t_3$, which occurs later than the pulse $t_2$ but before the pulse $t_4$, and is consequently supplied between the resetting of the second selection register by pulse $t_2$ and the resetting of the selection register by pulse $t_4$. For this purpose the pulse $t_3$ is applied, by way of conductor 645, to the left hand "and" circuits in all trigger circuits of the second selection register. Only if the corresponding trigger circuit in the selection register is set, and applies a high potential by way of its left-hand output circuit, such as 656, to the second input circuit of such an "and" circuit, will the pulse $t_3$ be able to reach the trigger circuit itself and set it. Be it assumed that the address transferred to the second selection register relates to a delayed conditional selection. Since the simple method of changing the address described above is applied in this embodiment, the first element in such an address is the same in all addresses relating to a delayed conditional operation. In this case the said element is 0, so that the trigger circuit 653 remains in the reset condition. The eventual condition of the circuit 654 is determined by the setting condition of the decision register in which the decision is stored. As has been described above, the instruction word controlling a delayed conditional selection causes the left-hand output circuit of the decision register storing the decision relating to this selection to be connected to the "and" circuit 551, so that the timing pulse $t_3$ will be able to pass this "and" circuit if the said decision register is set. This pulse is applied by way of conductor 550 "or" circuit 640 and conductor 644 to the left-hand "or" circuit in the trigger circuit 654, causing its trigger circuit to be set simultaneously with the transfer of the program address to the second decision register, in spite of the fact that the corresponding trigger circuit in the selection register is in the reset condition. If, however, the selected decision register storing the decision is in the reset condition, the timing pulse $t_3$ will be unable to pass the "and" circuit 551 and to reach the trigger circuit 654, which, consequently, will remain in the reset condition brought about by the timing pulse $t_2$ during the resetting of the second selection register, so that the said trigger circuit will store the same element as the trigger circuit 653, and the program address will remain unchanged.

Below the two selection registers that part of the output selector is shown that establishes the connection for the control of the non-delayed conditional selection. The condition register controls a non-delayed conditional operation if it has received the elements $a=0$, $b=1$, $c=d=e=0$. The element $b$ and the inverted elements $a$, $c$, $d$ and $e$, as received from the condition register, are applied to the "and" circuit 652, so that this circuit applies a high potential to the lower terminal of the "and" circuit 648. The undelayed operation in this embodiment can either be dependent on the fact whether a result is equal to another value or not, or on the fact, whether a result exceeds a given value or not. In the former case the elements $f$ and $g$ registered in the condition register are 0. Potentials corresponding to the inverted elements $f$ and $g$ are applied to input circuits of the "and" circuit 650, so that this circuit permits the decision signal which it receives from the arithmetic unit at its lower terminal to pass if the elements $f$ and $g$ have the value 0. If, for instance, because of equality having been established in the arithmetic unit, the program address should be changed, this unit applies a high potential to the said lower terminal. This potential, by way of "or" circuit 649, will reach the "and" circuit 648. Then two terminals of this circuit have a high potential, so that it is able to let the timing pulse $t_s$ applied to its upper terminal pass to the conductor 647 and the left-hand "or" circuit in the trigger circuit 655 in the selection register storing the third element in the address. As has been described above the said third element is 0 in an address relating to a non-delayed conditional operation and received from the program memory, so that the corresponding trigger circuit in the selection register does not supply a setting pulse to the circuit 655 if a non-delayed conditional operation is to be effected. The pulse received through conductor 647 will nevertheless set the trigger circuit 655, and thus add the binary value of the element stored in the said circuit to the address should this be required by the equality or non-equality established in the arithmetic unit. If no change in the address is required no high voltage is applied to the lower terminal of "and" circuit 650, so that no pulse will reach the trigger circuit 655.

If the conditional operation should depend on the fact whether a result obtained in the arithmetic unit exceeds a certain value or not the element $f$ in the instruction word is 1 and the element $g$ is 0. Because potentials corresponding the element $f$ and the inverted element $g$ are applied to input circuits of the "and" circuit 651, the signal by means of which the decision based on this condition is transmitted from the arithmetic unit to the output selector and which is applied to the upper terminal of the same "and" circuit 651 will be able to reach the "and" circuit 648 and to control the application of the timing pulse $t_s$ to the trigger circuit 655 in the way described above if the elements $f$ and $g$ have the said values. The timing pulse $t_s$ is a special pulse occurring after the result upon which the decision is based, becomes available in the arithmetic unit and is received from this unit. The pulse $t_3$ occurs too early for this purpose.

In the upper part of FIGURE 6 a decision matrix and the part of the output selector cooperating with it are shown. The matrix comprises a number of output conductors 606–617, which are connected by way of emitter followers such as 619 to the input circuits of the output selector. If a decision register in a certain condition should control a delayed conditional selection in cooperation with one or more other decision registers, the output circuit of the former decision register, which in the said condition has a high potential, is connected to an input circuit of the matrix. These input circuits are shown as horizontal lines in FIGURE 6. The reference at the left-hand side of such an input circuit corresponds to the reference of the decision register, an output circuit of which is connected to it, and carries an output if the said output circuit has a high potential if the register is in the reset condition. An output circuit of the matrix used for a certain combined condition is connected by way of diodes constituting an "and" or an "or" circuit to certain input circuits of the matrix. The output circuit 606, for instance, is connected so as to establish the condition that the registers 1 X and 2 Y are reset and the register 2 X is set. By way of resistor 618 this output circuit is connected to a potential which is at any rate higher than any potential that may be present at an output circuit of a decision register, and it is connected by way of diodes with the same direction as the potential difference to those output conductors of the three registers mentioned above, which will obtain a high potential if these registers are in the required conditions.

In a similar way the output circuit 610 is connected so as to establish the condition that either the register 3 X is reset or the register 2 Y is set, or both. It is obvious that the diodes connected to this conductor constitute an "or" circuit.

As may be derived from the above an output circuit of the decision matrix connected so as to establish a certain combined condition obtains a high potential if the condition is satisfied.

Each output circuit of the matrix is connected by way of an emitter follower, such as 619, to the central input terminal of an "and" circuit, such as 628, 629, 630. These "and" circuits are arranged in groups of four. The left-hand terminals of the "and" circuits of such a group are connected by way of a conductor, such as 625, 626, 627, to an "and" circuit with five input terminals, such as 631, 633, 635. Potentials corresponding to the elements and inverted elements *a, b, c, d* and *e* are applied in various combinations to the five input circuits of each of these "and" circuits. Potentials corresponding to the element c and the inverted elements *a, b, d* and *e*, for instance, are applied to the input circuits of the "and" circuit 631, so that this circuit applies a high potential to the left-hand input terminals of the four "and" circuits of the left-hand group if the elements *a, b, d* and *e* have the value 0 and the element *c* the value 1. Which of these four "and" circuits will be able to permit a voltage received from an output circuit of the matrix to pass, is determined by the potentials applied to the conductors 621, 622, 623 and 624. These potentials are determined by the potentials applied to the input circuits of the "and" circuits connected to these conductors. Each of these "and" circuits has two input terminals, to which the elements *f* and *g* and their inverted values are applied in four combinations, as shown in the figure. If, for instance, both elements have the value 1 the conductor 624 obtains a high potential, so that the left-hand "and" circuit in the group of four which has been selected in the way described above, will be able to connect the output circuit of the matrix connected to it to the output circuit of the output selector. In the case described the conductor 606 is selected. If this conductor obatins a high potential because of the combined condition being satisfied, this high potential is applied, by way of the "or" circuits 632 and 637 and the amplifier 638 to the "and" circuit 639, which consequently permits the timing pulse $t_3$ to pass to the "or" circuit 640, and through this circuit to the conductor 644 and the left-hand input terminal of trigger circuit 654 in the second selection register, causing this trigger circuit to be set as described above. Had an "and" circuit in one of the other groups of four been made operative in the way described above, the potential would have been supplied by way of the "or" circuit 634 or 636.

In the terminology of this specification the word element or code-element is equivalent to what in various other publications is called "bit."

If an element in a binary code is 1 (or 0) in this specification it is sometimes stated that it has the value 1 (or 0). This conception of value has nothing to do with the value added to a binary number if an element changes from 0 into 1. In a few clearly discernible cases the latter type of value is meant.

If it is stated in this specification that an element or its inverted value is applied to a terminal or circuit, this is a short description of the fact that a corresponding potential is applied to such a terminal or circuit.

Also in the case of a delayed conditional operation can the decision be made to depend on more than one criterion of the result obtained in the system. In a similar way as in the case of the non-delayed conditional operation, the criterion on which the decision is based can be selected under the control of the condition register in connection with certain elements in the instruction word. In an effective embodiment the device deriving the decision from the result has a separate output circuit for decisions based on each type of criterion, such a separate output circuit being connected to a separate input circuit of the decision selector.

In a non-delayed conditional operation the decision register is superfluous, because the decision need not be stored. Thus the number of decision registers can be restricted by restricting the use of these registers to delayed operations only. Moreover, in rapidly operating systems the application of decision registers for non-delayed operations may be disadvantageous, for in such systems the interval between the setting of a decision register, which for a decision based on a result is controlled by the pulse $t_4$, and the transfer of the following instruction word from the program memory to the various registers, which is controlled by the timing pulse $t_1$, is too short to permit the reading of the decision registers and the change in the program address to be effected. Consequently, in such rapidly operating systems, the use of decision registers for non-delayed operations would require the postponement of the "non-delayed" operation to an extra cycle of operations effected after the cycle in which the decision relating to this operation has become available. For this reason decision registers are used for delayed conditional operations only.

I claim:

1. In an electronically operating data processing system, operable in various sequences of steps of operations, at least one processing unit, data storage means comprising a number of locations for storing data, program storage means with a number of locations, each for storing a fixed instruction word capable of controlling one step of operation of the system, means reacting to certain bits in certain positions of an instruction word by selecting locations in the data storage means, means reacting to certain bits in certain positions of an instruction word by setting said processing unit so as to effect certain operations with data stored in the selected locations of the data storage means, means reacting to other bits of an instruction word constituting an instruction word by selecting the location in the program storage means storing the instruction word which is to control the next step of operations, at least one decision establishing means receiving results obtained in the processing unit for deciding whether said result fulfills a certain condition, output circuit means for said decision establishing means, to which the decision establishing means, depending upon the decisions taken, apply different potentials, a plurality of decision registers comprising storage means including input circuits for controlling the setting of the said storage means and output circuit means for reading the setting of the said storage means, an input selector, a channel between said input selector and the output circuit means of the decison establishing means, control means for said input selector controlled by certain bits in certain positions of an instruction word for controlling said input selector to establish a control connection between said channel and input circuits of the storage means in a decision register identified by the said bits, over which control connection the storage means are set in accordance with the potential supplied over said channel, modifying means for modifying the instruction word address, as supplied by a location in the program storage means, before it effects the selection of the next location in the program storage means, and an output selector controlled by certain bits in certain positions of an instruction word to establish a connection between said modifying means and the output circuit means of the storage means comprised in a decision register identified by said bits, said modifying means being controlled over this connection by the storage means, depending upon the setting of said storage means, either to modify the instruction word address as supplied by the program storage means or to leave the said address unchanged.

2. The system according to claim 1, further comprising several fixed potential sources, and a decision selector in the channel between the input selector and the output circuit means of the decision establishing means, means in said decision selector reacting to bits on certain positions in the instruction word depending upon the character of these bits by controlling the decision selector selectively to connect the input selection channel to said output circuit means and one source of said sources of fixed potential.

3. In a system according to claim 2, a condition register for receiving the part of the instruction word comprising the bits controlling the input selector, the output selector and the decision selector and storing this part during the cycle controlled by the said instruction word.

4. In a system according to claim 1 a direct connection between the output circuit means of the decision establishing means and the output selector, and means in the said output selector reacting to certain bits in certain positions of the instruction word by joining said connection to the modifying means.

5. In a system according to claim 1, the decision establishing means including means capable of taking decisions based on different criteria, different output circuit means in said decision establishing means for each of said criteria, means in the decision establishing means for applyng a potential to said different output circuit means for the purpose of signalling a decision based on the criterion to which the respective circuit means belongs, and means reacting to certain bits on certain positions of the instruction word by connecting the channel to an output circuit means related to a certain criterion.

6. In a system according to claim 2 decision establishing means including means for making decisions based on different criteria, different output circuit means in said decision establishing means for each of said criteria, means in the decision establishing means for applying a potential to said output circuit means to signal a decision based on the criterion with which the respective output circuit means is associated and means in the decision selector reacting to certain bits in certain positions of the instruction word by controlling the decision selector to join the channel to an output circuit means belonging to a certain criterion.

7. In a system according to claim 1, a logical matrix having input circuits connected to output circuits of the decision registers and having output circuits connected to the output selector in circuit connections corresponding to the circuit connection of certain output circuits of the decision registers to the output selector.

8. In a system according to claim 7, "and" circuits or "or" circuits between certain output circuits of the matrix and the output selector.

9. A data-processing system sequentially operable through a sequence of program steps as defined by instruction words which include command bits for defining the processing step to be performed, operand address bits for defining the address of an operand, and positions for first control bits and second control bits, said processing system comprising: processing means for performing processing steps on operands; a data storage means including a plurality of addressed locations for storing operands; a program storage means including a plurality of addressed locations for storing instruction words; instruction word address-generating means for indicating the address of a desired instruction word; instruction word selection means for selecting from the program storage means the instruction word stored in the location associated with the address generated by the instruction word address-generating means; means responsive to the operand address bits of a selected instruction word for selecting from said data storage means the operand stored in the location associated with the operand address bits of the selected instruction word; means responsive to the command bits of the selected instruction word for controlling said processing means to process the selected operand in accordance with the processing step defined by said command bits; a decision-establishing means connected to said processing means for generating control indications in accordance with the results of the processing step performed on the selected operand; a decision register including means for storing the control indication; indication input control means responsive to the presence of first control bits in the selected instruction word for transferring the control indication generated by said decision-establishing means to said decision register; instruction word address-modifying means for modifying the address generated by said instruction word address-generating means; and indication output control means responsive to the presence of second control bits in a subsequently selected instruction word for transferring the control indications stored in said decision register to said instruction word address-modifying means to cause it to modify the address generated by said instruction word address-generating means in accordance with the received control indications so that said instruction word selection means selects from the program storage means the instruction word stored in the location associated with the modified instruction word address.

10. In a data-processing system which is sequentially operable through a sequence of program steps as defined by instruction words which include command bits for defining the processing step to be performed, operand address bits for defining the address of an operand, and positions for first control bits and second control bits, and which includes processing means for performing processing steps on operands; a data storage means including a plurality of addressed locations for storing operands; a program storage means including a plurality of addressed locations for storing instruction words; instruction word address-generating means for indicating the address of a desired instruction word; instruction word selection means for selecting from the program storage means the instruction word stored in the location associated with the address generated by the instruction word address-generating means; means responsive to the operand address bits of a selected instruction word for selecting from said data storage means the operand stored in the location associated with the operand address bits of the selected instruction word; means responsive to the command bits of the selected instruction word for controlling said processing means to process the selected operand in accordance with the processing step defined by said command bits; a decision-establishing means connected to said processing means for generating control indications in accordance with the results of the processing step performed on the selected operand; and instruction word address-modifying means for modifying the address generated by said instruction word address-generating means; the improvement comprising a plurality of decision registers, each of said decision registers including an input means, a storage means and an output means, input selector means for selectively connecting said decision-establishing means to the input means of one of said decision registers in accordance with the presence of given combinations of first control bits in a selected instruction word so that the storage register stores the generated control indications and output selector means for selectively connecting said instruction word address-modifying means to the output means of one of said decision registers in accordance with the presence of given combinations of second control bits in a selected instruction word for transferring the control indications stored in the storage means of the selected decision register to said instruction word address-modifying means to cause it to modify the address generated by said instruction word address-generating means in accordance with the received control indication so that said instruction word selection means selects from the program storage means the instruction word stored in the location associated with the modified instruction word address.

References Cited by the Examiner

UNITED STATES PATENTS 2,914,248 11/1959 Ross et al. ---------- 235—157

OTHER REFERENCES

Pages 27–32, 1960, Reference Manual IBM 1410 Data Processing System, A22–1407–2.

ROBERT C. BAILEY, *Primary Examiner.*

MALCOLM A. MORRISON, WALTER W. BURNS, Jr., *Examiners.*

B. D. REIN, W. M. BECKER, *Assistant Examiners.*